United States Patent
Heo et al.

(10) Patent No.: US 9,580,528 B2
(45) Date of Patent: Feb. 28, 2017

(54) AROMATIC VINYL BASED TETRAPOLYMER, METHOD FOR PREPARING THE SAME AND THERMOPLASTIC RESIN COMPOSITION COMPRISING THE SAME

(71) Applicant: Samsung SDI Co., Ltd., Yongin-si (KR)

(72) Inventors: Jae Won Heo, Uiwang-si (KR); Joo Hyun Jang, Uiwang-si (KR); Bo Eun Kim, Uiwang-si (KR); Kwang Soo Park, Uiwang-si (KR); Natarajan Senthilkumar, Uiwang-si (KR); Young Sub Jin, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/748,937

(22) Filed: Jun. 24, 2015

(65) Prior Publication Data

US 2015/0376316 A1    Dec. 31, 2015

(30) Foreign Application Priority Data

Jun. 27, 2014   (KR) ......................... 10-2014-0079501

(51) Int. Cl.
| | | |
|---|---|---|
| *C08F 212/12* | (2006.01) | |
| *C08F 222/40* | (2006.01) | |
| *C08F 220/44* | (2006.01) | |
| *C08F 212/08* | (2006.01) | |

(52) U.S. Cl.
CPC .......... *C08F 212/12* (2013.01); *C08F 222/40* (2013.01)

(58) Field of Classification Search
CPC ..... C08F 220/48; C08F 212/12; C08F 222/40
USPC ....................................................... 526/331
See application file for complete search history.

(56) References Cited

U.S. PATENT DOCUMENTS

| | | | | |
|---|---|---|---|---|
| 8,124,703 | B2 * | 2/2012 | Sohn ........................ | C08F 2/02 526/262 |
| 8,487,057 | B2 * | 7/2013 | Sohn ........................ | C08F 2/02 526/262 |

FOREIGN PATENT DOCUMENTS

| | | | | |
|---|---|---|---|---|
| JP | WO 8604337 | A1 * | 7/1986 | ............ C08F 222/40 |
| JP | 0208790 | A1 * | 1/1987 | ............ C08F 222/40 |
| JP | 05148310 | A    * | 6/1993 | |

* cited by examiner

*Primary Examiner* — Michael M Bernshteyn
(74) *Attorney, Agent, or Firm* — Additon, Higgins & Pandleton, P.A.

(57) ABSTRACT

A method for preparing a tetrapolymer includes preparing a suspension including an aromatic vinyl-based monomer, an unsaturated nitrile-based monomer, an N-substituted maleimide-based monomer, an α-alkyl styrene-based monomer, and an inorganic dispersing agent, and polymerizing the suspension. The method for preparing a tetrapolymer can be useful in lowering a reaction temperature using suspension polymerization, and reducing a reaction time, thereby maximizing productivity. A tetrapolymer prepared by the method is also provided.

21 Claims, No Drawings

AROMATIC VINYL BASED TETRAPOLYMER, METHOD FOR PREPARING THE SAME AND THERMOPLASTIC RESIN COMPOSITION COMPRISING THE SAME

CROSS-REFERENCE TO RELATED APPLICATION

This application claims priority under 35 USC Section 119 to and the benefit of Korean Patent Application No. 10-2014-0079501, filed on Jun. 27, 2014 in the Korean Intellectual Property Office, the entire disclosure of which is incorporated herein by reference.

FIELD OF THE INVENTION

Exemplary embodiments of the present invention relate to an aromatic vinyl based tetrapolymer, a method for preparing the same, and a thermoplastic resin composition including the same.

BACKGROUND

Styrenic copolymers such as styrene-acrylonitrile-based copolymers (SANs) can have excellent elasticity and heat resistance, and thus have been used in various industries requiring heat resistance. For example, heat resistance styrene-acrylonitrile-based copolymers (SANs) have been used for electrical and electronic parts, interior/exterior materials for automobiles, heat-resistant plastic containers, etc.

Heat resistant styrene-acrylonitrile-based copolymers (SANs) have been used in the form of an α-methylstyrene-styrene-acrylonitrile resin obtained by terpolymerizing α-methylstyrene, styrene, and acrylonitrile. Also, other monomers are often added, and prepared into multiblock copolymers so as to realize a higher level of heat resistance.

However, since α-methylstyrene has a low ceiling temperature, it has a slow reaction speed upon copolymerization, and can require a high temperature condition and a long reaction time. In this case, the economic feasibility and efficiency upon preparation of copolymers may be degraded.

Meanwhile, in preparing the styrene-acrylonitrile-based multiblock copolymers, it can be very difficult to adjust a polymerization speed and heat generated in the reaction. When the polymerization speed upon the preparation of the copolymers is very slow, productivity is lowered. When the polymerization speed upon the preparation of the copolymers is too fast, however, conversion rate of the copolymers can be reduced. Also, when the heat of the reaction and a process temperature upon polymerization are high, discoloration resistance may be reduced due to an increase in a thermal history applied to the copolymers.

Therefore, when other monomers are added to prepare a copolymer, conventional polymerization methods use solution polymerization or emulsion polymerization. However, the solution polymerization has a problem in that it requires a solvent recovery system and a separate solvent bath, resulting in a decrease in productivity and an increase in manufacturing cost. When the emulsion polymerization is used, it has a disadvantage in that processes are complicated, the productivity is poor, and it does not work easily.

Accordingly, there is a need for methods for preparing an aromatic vinyl based copolymer, which can reduce the thermal history applied to the copolymers during a preparation process, and simultaneously improve productivity and economic feasibility due to a short reaction time and a high conversion rate of the copolymer.

SUMMARY OF THE INVENTION

Exemplary embodiments provide a method for preparing a tetrapolymer, which includes preparing a suspension comprising an aromatic vinyl-based monomer, an unsaturated nitrile-based monomer, an N-substituted maleimide-based monomer, an α-alkyl styrene-based monomer, and an inorganic dispersing agent; and polymerizing the suspension.

The inorganic dispersing agent may be added in an amount of about 0.01 parts by weight to about 20 parts by weight, based on a total of about 100 parts by weight of the monomers.

The inorganic dispersing agent may include at least one inorganic compound selected from the group consisting of tricalcium phosphate, dicalcium phosphate, calcium phosphate, and mixtures thereof.

In the preparing of the suspension, the N-substituted maleimide-based monomer may be added to a dispersion medium in a state in which the N-substituted maleimide-based monomer is dissolved in the unsaturated nitrile-based monomer.

The N-substituted maleimide-based monomer may be included in an amount of about 5% by weight to about 35% by weight, based on the total weight of the monomers.

A weight ratio of the N-substituted maleimide-based monomer and the unsaturated nitrile-based monomer may be in a range of about 1:0.95 to about 1:8.

The suspension may further include an organic dispersing agent.

The suspension may further include a polymerization initiator.

The polymerization may be performed at a temperature of about 70° C. to about 100° C.

The aromatic vinyl-based monomer may include at least one selected from the group consisting of styrene, vinyltoluene, t-butylstyrene, halogen-substituted styrene, 1,3-dimethylstyrene, 2,4-dimethylstyrene, m-ethylstyrene, o-ethylstyrene, and/or p-ethylstyrene.

The unsaturated nitrile-based monomer may include at least one selected from the group consisting of acrylonitrile, methacrylonitrile, ethacrylonitrile, phenylacrylonitrile, and/or α-chloroacrylonitrile.

The N-substituted maleimide-based monomer may include at least one selected from the group consisting of N-phenylmaleimide, N-methylmaleimide, N-ethylmaleimide, N-propylmaleimide, N-isopropylmaleimide, N-butylmaleimide, N-isobutylmaleimide, N-t-butylmaleimide, N-cyclohexylmaleimide, N-chlorophenylmaleimide, N-methylphenylmaleimide, N-bromophenylmaleimide, N-naphthylmaleimide, N-laurylmaleimide, N-hydroxyphenylmaleimide, N-methoxyphenylmaleimide, N-carboxyphenylmaleimide, N-nitrophenylmaleimide, and/or N-benzylmaleimide.

The α-alkyl styrene-based monomer may include at least one selected from the group consisting of α-methylstyrene, α-ethylstyrene, and/or methyl α-methylstyrene.

Exemplary embodiments provide a tetrapolymer prepared by the above-described method for preparing a tetrapolymer.

The tetrapolymer may include an inorganic dispersing agent in an amount of about 0.0001% by weight to about 0.1% by weight.

The tetrapolymer may have a glass transition temperature ($T_g$) of about 100° C. to about 150° C.

The tetrapolymer may have a weight average molecular weight of about 128,000 g/mol to about 160,000 g/mol.

Exemplary embodiments provide a thermoplastic resin composition including the above-described tetrapolymer.

Exemplary embodiments provide a molded article including the above-described thermoplastic resin composition.

The method for preparing an aromatic vinyl based tetrapolymer according to the exemplary embodiments of the present invention may use suspension polymerization to prepare an aromatic vinyl-unsaturated nitrile-α-alkyl styrene-maleimide tetrapolymer. The preparation method has advantages in that a reaction temperature can be low, a reaction time may be remarkably reduced to maximize productivity, and it can have a high conversion rate.

The aromatic vinyl based tetrapolymer according to exemplary embodiments of the present invention can have high heat resistance and/or excellent processability, and/or may realize a low yellow index since the aromatic vinyl based tetrapolymer can undergo a lower level of thermal history due to a low polymerization reaction temperature.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Hereinafter, an aromatic vinyl based tetrapolymer, a method for preparing the same, and a thermoplastic resin composition including the tetrapolymer according to the exemplary embodiments of the present invention will be described in detail. Exemplary embodiments disclosed herein are provided as examples for the purpose of sufficiently providing the scope of the present invention to those skilled in the related art. Also, unless specifically stated otherwise, all the technical and scientific terms used in this specification have the same meanings as what are generally understood by a person skilled in the related art to which the present invention belongs. In the following description, detailed descriptions of well-known functions or constructions will be omitted since they would obscure the invention in unnecessary detail.

In exemplary embodiments, the aromatic vinyl based tetrapolymer includes (A) an aromatic vinyl-based monomer, (B) an unsaturated nitrile-based monomer, (C) an N-substituted maleimide-based monomer, and (D) an α-alkyl styrene-based monomer as polymerization units. The aromatic vinyl based tetrapolymer is prepared by subjecting a mixture of the monomers used as the polymerization units to suspension polymerization. The prepared aromatic vinyl based tetrapolymer includes an inorganic dispersing agent in an amount of about 0.1% by weight or less.

(A) Aromatic Vinyl-Based Monomer

The aromatic vinyl-based monomer may be an aromatic monomer substituted with a vinyl group. The aromatic monomer substituted with the vinyl group may be a monomer in which at least one vinyl group is directly bound to an aromatic ring. The aromatic monomer may, for example, include benzene, toluene, xylene, etc.

In exemplary embodiments, the aromatic monomer substituted with the vinyl group may be further substituted with an alkyl group having 1 to 5 carbon atoms. In this case, the alkyl group is directly substituted on the aromatic ring, and one or more alkyl groups may be provided. That is, the aromatic monomer substituted with the vinyl group excludes monomers in which an alkyl group is further substituted at an α-carbon atom of a substituent.

In exemplary embodiments, the aromatic monomer substituted with the vinyl group may be a styrenic monomer. Examples of the styrenic monomer may include without limitation styrene, vinyltoluene, t-butylstyrene, halogen-substituted styrene, 1,3-dimethylstyrene, 2,4-dimethylstyrene, m-ethylstyrene, o-ethylstyrene, p-ethylstyrene, and the like. The above-listed monomers may be used alone or in combination.

In exemplary embodiments, the aromatic vinyl-based monomer may include styrene. In this specification, the styrenic monomer used as the aromatic vinyl-based monomer means that the styrenic monomer excludes styrenes in which an α-carbon atom is substituted with an alkyl group.

The aromatic vinyl-based monomer may be included in an amount of about 5% by weight to about 40% by weight, based on the total weight (100% by weight) of the mixture of monomers used to prepare the aromatic vinyl based tetrapolymer. In some embodiments, the aromatic vinyl-based monomer may be included in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight, based on the total weight of the mixture of monomers used to prepare the tetrapolymer. Further, according to some embodiments, the amount of the aromatic vinyl-based monomer can be in a range from about any of the foregoing amounts to about any other of the foregoing amounts. The tetrapolymer satisfying this content range may have a superior reaction rate during a preparation process, thereby enhancing economic feasibility.

In exemplary embodiments, the aromatic vinyl-based monomer may be included in an amount of about 8% by weight to about 28% by weight, about 10% by weight to about 25% by weight, about 18% by weight to about 25% by weight, or about 20% by weight to about 25% by weight, based on the total weight (100% by weight) of the mixture of the monomers included as the polymerization unit. When this content range is satisfied, the tetrapolymer may have superior physical properties and processability.

(B) Unsaturated Nitrile-Based Monomer

The unsaturated nitrile-based monomer is a monomeric compound including a radical-polymerizable unsaturated hydrocarbon group and a cyanide group. Examples of the unsaturated nitrile-based monomer can include without limitation acrylonitrile, methacrylonitrile, ethacrylonitrile, phenylacrylonitrile, α-chloroacrylonitrile, and the like. The above-listed monomers may be used alone or in combination. In exemplary embodiments, the unsaturated nitrile-based monomer may include acrylonitrile. In this case, the tetrapolymer may exhibit low heat deformability after molding.

The unsaturated nitrile-based monomer may be included in an amount of about 15% by weight to about 40% by weight, based on the total weight (100% by weight) of the mixture of monomers used to prepare the aromatic vinyl based tetrapolymer. In some embodiments, the unsaturated nitrile-based monomer may be included in an amount of about 15, 16, 17, 18, 19, 20, 21, 22, 23, 24, 25, 26, 27, 28, 29, 30, 31, 32, 33, 34, 35, 36, 37, 38, 39, or 40% by weight, based on the total weight of the mixture of monomers used to prepare the tetrapolymer. Further, according to some embodiments, the amount of the unsaturated nitrile-based monomer can be in a range from about any of the foregoing amounts to about any other of the foregoing amounts. When this content range is satisfied, the unsaturated nitrile-based monomer can have excellent compatibility with other components, and chemical resistance of the tetrapolymer may be improved.

In exemplary embodiments, the unsaturated nitrile-based monomer may be included in an amount of about 20% by weight to about 30% by weight, about 20% by weight to about 29% by weight, or about 20% by weight to about 24% by weight, based on the total weight of the mixture of monomers included as the polymerization units in the tetrapolymer. Also, the tetrapolymer satisfying this content range may have a superior reaction rate during a preparation process, thereby enhancing economic feasibility.

In exemplary embodiments, the unsaturated nitrile-based monomer may serve to dissolve an N-substituted maleimide-based monomer to be described later and participate in reactions. In this case, the tetrapolymer may have excellent uniformity.

(C) N-Substituted Maleimide-Based Monomer

The N-substituted maleimide-based monomer may serve to further improve heat resistance properties of the prepared tetrapolymer and/or enhance heat deformation temperature. In this case, the tetrapolymer may be applied to materials requiring high heat resistance. Also, the N-substituted maleimide-based monomer may exhibit excellent reactivity with other monomers upon copolymerization, thereby shortening a reaction time and lowering a reaction temperature of a polymerization reaction. Therefore, productivity of the tetrapolymer may be maximized.

Examples of the N-substituted maleimide-based monomer may include without limitation N-phenylmaleimide, N-methylmaleimide, N-ethylmaleimide, N-propylmaleimide, N-isopropylmaleimide, N-butylmaleimide, N-isobutylmaleimide, N-t-butylmaleimide, N-cyclohexylmaleimide, N-chlorophenylmaleimide, N-methylphenylmaleimide, N-bromophenylmaleimide, N-naphthylmaleimide, N-laurylmaleimide, N-hydroxyphenylmaleimide, N-methoxyphenylmaleimide, N-carboxyphenylmaleimide, N-nitrophenylmaleimide, N-benzylmaleimide, and the like. The above-listed monomers may be used alone or in combination. In exemplary embodiments, the N-substituted maleimide-based monomer may include N-phenylmaleimide.

The N-substituted maleimide-based monomer may be included in the tetrapolymer since the N-substituted maleimide-based monomer is dissolved in an unsaturated nitrile-based monomer and added to a dispersion medium during a polymerization reaction. In this case, the N-substituted maleimide-based monomer may serve to improve uniformity of the polymerization reaction. Therefore, the tetrapolymer may serve to further improve heat resistance and processability. A method of using the N-substituted maleimide-based monomer will be described in the discussion of a polymerization method hereinafter in this application.

The N-substituted maleimide-based monomer may be included in an amount of about 5% by weight to about 35% by weight, based on the total weight (100% by weight) of the mixture of monomers used to prepare the aromatic vinyl based tetrapolymer. In some embodiments, the N-substituted maleimide-based monomer may be included in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35% by weight, based on the total weight of the mixture of monomers used to prepare the tetrapolymer. Further, according to some embodiments, the amount of the N-substituted maleimide-based monomer can be in a range from about any of the foregoing amounts to about any other of the foregoing amounts. In this case, a synergistic effect of physical properties including high heat resistance may be realized due to a combination with other components.

In exemplary embodiments, the N-substituted maleimide-based monomer may be included in an amount of about 10% by weight to about 30% by weight, about 15% by weight to about 25% by weight, or about 16% by weight to about 20% by weight, based on the total weight of the mixture of monomers included as the polymerization units of the tetrapolymer. Within this content range, the tetrapolymer may exhibit maximized productivity and excellent polymerization uniformity due to a short reaction time upon polymerization.

(D) α-Alkyl Styrenic Monomer

The α-alkyl styrenic monomer may serve to improve heat resistance properties of the tetrapolymer and/or enhance economic feasibility upon preparation of copolymers. Also, the α-alkyl styrenic monomer may be combined with the N-substituted maleimide-based monomer to further enhance heat-resistant temperature and/or heat deformation temperature of the tetrapolymer. In addition, the α-alkyl styrenic monomer may have compatibility with other monomers, particularly an aromatic vinyl-based monomer and a maleimide-based monomer, thereby realizing excellent processability.

In exemplary embodiments, the α-alkyl styrenic monomer is a monomer in which an alkyl group is directly bound to an α-carbon atom included in a styrene. The alkyl group may be, for example, an alkyl group having 1 to 5 carbon atoms, and the shape of the alkyl group may be branched, linear, cyclic, etc.

Examples of the α-alkyl styrenic monomer may include without limitation α-methylstyrene, α-ethylstyrene, methyl α-methylstyrene, and the like. The above-listed monomers may be used alone or in combination.

The α-alkyl styrenic monomer may be included in an amount of about 30% by weight to about 60% by weight, based on to the total weight (100% by weight) of the mixture of monomers used to prepare the aromatic vinyl based tetrapolymer. In some embodiments, the α-alkyl styrenic monomer may be included in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60% by weight, based on the total weight of the mixture of monomers used to prepare the tetrapolymer. Further, according to some embodiments, the amount of the α-alkyl styrenic monomer can be in a range from about any of the foregoing amounts to about any other of the foregoing amounts.

Within this content range, the tetrapolymer can have excellent compatibility. Since the tetrapolymer can have an excellent effect of shortening a reaction time upon preparation thereof, the tetrapolymer may also exhibit excellent economic feasibility within this content range.

In exemplary embodiments, the α-alkyl styrenic monomer may be included in an amount of about 33% by weight to about 50% by weight, or about 40% by weight to about 50% by weight, based on the total weight of the mixture of monomers included as the polymerization units in the tetrapolymer. Within this content range, processability of the tetrapolymer may be further improved, and a reaction time upon a polymerization reaction may be further shortened.

In exemplary embodiments, the aromatic vinyl based tetrapolymer may be prepared by adding an inorganic dispersing agent to be described below to the mixture of monomers including the aromatic vinyl-based monomer, the unsaturated nitrile-based monomer, the N-substituted maleimide-based monomer, and the α-alkyl styrenic monomer, and subjecting the resulting mixture to suspension polymerization. According to one embodiment, the mixture of monomers may include a styrenic monomer, an acrylonitrile monomer, an N-phenylmaleimide monomer and an α-methylstyrene monomer. In this case, the tetrapolymer may be a styrene-acrylonitrile-phenylmaleimide-α-methylstyrene tetrapolymer.

(E) Dispersing Agent

The aromatic vinyl based tetrapolymer includes an inorganic dispersing agent. The dispersing agent in the aromatic vinyl based tetrapolymer may include some of the dispersing agent used in the preparation thereof. For example, the amount of the inorganic dispersing agent in the tetrapolymer may be less than or equal to about 0.1% by weight, for example about 0.0001% by weight to about 0.1% by weight. In some embodiments, the aromatic vinyl based tetrapolymer includes an inorganic dispersing agent in an amount of about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, or 0.1% by weight. Further, according to some embodiments, the amount of the inorganic dispersing agent can be in a range from about any of the foregoing amounts to about any other of the foregoing amounts. When the amount of the inorganic dispersing agent included in the tetrapolymer is greater than about 0.1% by weight, physical properties of the tetrapolymer may be degraded.

In this case, the content of the inorganic dispersing agent is a content of the dispersing agent included in the prepared aromatic vinyl based tetrapolymer, but not a content of the dispersing agent added upon preparation of the copolymer. An amount of the added inorganic dispersing agent used in the preparation of the aromatic vinyl based tetrapolymer will be described later.

In exemplary embodiments, the amount of the inorganic dispersing agent included in the copolymer may be in a range of about 0.0001% by weight to about 0.1% by weight, for example about 0.01% by weight to about 0.08% by weight, and as another example about 0.01% by weight to about 0.07% by weight. Within this content range, the tetrapolymer may have superior physical properties.

The inorganic dispersing agent may be used for remarkable dispersion effects and suspension stability upon suspension polymerization.

Examples of the inorganic dispersing agent may include without limitation aluminum hydroxide, ferric hydroxide, titanium hydroxide, a phosphate-based compound, a carbonate-based compound, a sulfate compound, and the like, and combinations thereof. In exemplary embodiments, the inorganic dispersing agent may include a phosphate compound, for example, a metal phosphate-based inorganic compound. Examples of the metal phosphate-based inorganic compound may include without limitation tricalcium phosphate, dicalcium phosphate, and/or calcium phosphate. In this case, the prepared tetrapolymer may have a low heat deformation rate after molding. Also, when such a dispersing agent is included, the tetrapolymer may have excellent uniformity and high reaction speed upon polymerization, thereby further improving economic feasibility.

The aromatic vinyl based tetrapolymer may further include an organic dispersing agent. The organic dispersing agent may include a homopolymer and/or a copolymer of acrylic acid and/or methacrylic acid, but the present invention is not particularly limited thereto. In this case, processability of the prepared tetrapolymer may be improved. Also, when such an organic dispersing agent is further included, copolymerization reaction speed may be further enhanced, and the yield of the tetrapolymer may be further increased.

In exemplary embodiments, the amount of the organic dispersing agent included in the tetrapolymer may be in a range of about 0.0001% by weight to about 0.1% by weight, for example about 0.01% by weight to about 0.08% by weight, and as another example about 0.01% by weight to about 0.07% by weight. In some embodiments, the aromatic vinyl based tetrapolymer includes an organic dispersing agent in an amount of about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, or 0.1% by weight. Further, according to some embodiments, the amount of the organic dispersing agent can be in a range from about any of the foregoing amounts to about any other of the foregoing amounts. Within this content range, the tetrapolymer may have further improved physical properties.

The aromatic vinyl based tetrapolymer may have a glass transition temperature ($T_g$) of about 100° C. to about 150° C., for example, about 120° C. to about 140° C. Within this glass transition temperature range, the tetrapolymer may be used as a thermoplastic resin when used together with another resin. In this case, the tetrapolymer may have a small difference in processing temperature from other resins, thereby further improving compatibility with the resins. That is, when the tetrapolymer with a glass transition temperature ($T_g$) falling within this temperature range is mixed with another resin and used as a thermoplastic resin, temperature resistance of an molded article may be further improved.

The aromatic vinyl based tetrapolymer may have a weight average molecular weight of about 128,000 g/mol to about 160,000 g/mol, for example about 130,000 g/mol to about 160,000 g/mol, and as another example about 150,000 g/mol to about 160,000 g/mol. Within this molecular weight range, the aromatic vinyl based tetrapolymer can be prepared into a molded article. Also within this molecular weight range, the tetrapolymer may be used as a thermoplastic resin when used together with another resin. When the tetrapolymer of the above molecular weight range is mixed with another resin and used as a thermoplastic resin, processability of a molded article may be further improved.

Exemplary embodiments further relate to a method for preparing an aromatic vinyl based tetrapolymer which includes subjecting the above-described mixture of monomers including (A) the aromatic vinyl-based monomer, (B) the unsaturated nitrile-based monomer, (C) the N-substituted maleimide-based monomer, and (D) the α-alkyl styrene-based monomer to suspension polymerization.

In exemplary embodiments, when the aromatic vinyl based tetrapolymer is prepared using suspension polymerization, a reaction may be performed at a relatively lower temperature than other polymerizations. In this case, the obtained tetrapolymer may undergo a lower level of a thermal history, and can thereby exhibit excellent discoloration resistance. Also, in a polymerization procedure, the N-substituted maleimide-based monomer can provide an advantage in that it may be highly reactive with other monomers, and can thereby remarkably reduce reaction time.

In exemplary embodiments, the method for preparing an aromatic vinyl based tetrapolymer includes preparing a suspension including an aromatic vinyl-based monomer, an unsaturated nitrile-based monomer, an N-substituted maleimide-based monomer, an α-alkyl styrene-based monomer, and an inorganic dispersing agent; and reacting the suspension (conducting suspension polymerization).

In exemplary embodiments, the step of preparing of the suspension includes dispersing (A) the aromatic vinyl-based monomer, (B) the unsaturated nitrile-based monomer, (C) the N-substituted maleimide-based monomer, and (D) the α-alkyl styrene-based monomer in a dispersion medium.

When the monomers are dispersed in the dispersion medium, the N-substituted maleimide-based monomer may be dispersed in the dispersion medium in a state in which the N-substituted maleimide-based monomer is dissolved in the unsaturated nitrile-based monomer. In exemplary embodiments, a method of dispersing the N-substituted maleimide-based monomer in the dispersion medium may include a method which includes mixing a solid-phase N-substituted maleimide-based monomer with an unsaturated nitrile-based monomer in advance, dissolving the solid-phase N-substituted maleimide-based monomer in the unsaturated nitrile-based monomer while sufficiently stirring, and adding the resulting mixture to a dispersion medium. In this case, since the N-substituted maleimide-based monomer serves to improve uniformity of a polymerization reaction, heat resistance and/or processability may be further improved, and a conversion rate to the copolymer may be enhanced. Also, when the maleimide-based monomer is dissolved in the unsaturated nitrile-based monomer in advance and used, an increase in reaction temperature caused due to a sudden increase in polymerization speed may be prevented. Therefore, a reaction temperature may be properly adjusted, and the yield of the tetrapolymer may be enhanced.

When the N-substituted maleimide-based monomer is dissolved in the unsaturated nitrile-based monomer and used, a weight ratio of the N-substituted maleimide-based monomer and the unsaturated nitrile-based monomer may be in a range of about 1:0.95 to about 1:8. Within this weight ratio range, the copolymer may have excellent solubility. Further in exemplary embodiments, the weight ratio of the N-substituted maleimide-based monomer and the unsaturated nitrile-based monomer may be in a range of about 1:1.1 to about 1:5, about 1:1.3 to about 1:3, or about 1:1.5 to about 1:2.5. In this case, the prepared tetrapolymer may have excellent uniformity, and it may be easy to adjust a glass transition temperature of the tetrapolymer.

The step of preparing of the suspension may include adding an inorganic dispersing agent to a dispersion medium. In exemplary embodiments, the inorganic dispersing agent may be added after the above-listed monomers are dispersed in the dispersion medium. In other exemplary embodiments, the inorganic dispersing agent may be added to the dispersion medium before the above-listed monomers are dispersed in the dispersion medium.

The inorganic dispersing agent that may be used in the preparing of the suspension may be the same as the inorganic dispersing agents that may be included in the above-described tetrapolymer. In exemplary embodiments, the inorganic dispersing agent used in the preparation of the aromatic vinyl based tetrapolymer may be added in an amount of about 0.01 to about 20 parts by weight, based on about 100 parts by weight of mixture of the monomers. In some embodiments, the inorganic dispersing agent may be used in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 parts by weight. Further, according to some embodiments, the amount of the inorganic dispersing agent can be in a range from about any of the foregoing amounts to about any other of the foregoing amounts. Within this content range, the yield of the tetrapolymer may be further improved due to an excellent dispersion effect. Within this content range, the prepared tetrapolymer may also have further improved physical properties.

The step of preparing of the suspension may include further adding an organic dispersing agent to the inorganic dispersing agent to be used. In this case, the types of the organic dispersing agent are the same as the organic dispersing agents that may be included in the above-described tetrapolymer. In exemplary embodiments, the organic dispersing agent used to prepare the aromatic vinyl based tetrapolymer may be added in an amount of about 0.01 to about 20 parts by weight, based on about 100 parts by weight of mixture of the monomers. In some embodiments, the organic dispersing agent may be used in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 parts by weight. Further, according to some embodiments, the amount of the organic dispersing agent can be in a range from about any of the foregoing amounts to about any other of the foregoing amounts.

In exemplary embodiments, a weight ratio of the inorganic dispersing agent and the organic dispersing agent may be in a range of about 5:1 to about 25:1. Within this weight ratio range, the yield of the tetrapolymer may be further improved due to an excellent dispersion effect. Within this weight ratio range, the prepared tetrapolymer may also have further improved physical properties.

The suspension may further include a polymerization initiator. Examples of the polymerization initiator may include without limitation an azo compound such as 2,2'-azobisisobutyronitrile, and the like; a diacyl peroxide compound such as benzoyl peroxide, and the like; a peroxyester compound such as t-butylperoxy isobutyrate, t-butylperoxy-2-ethylhexanoate, polyether poly-t-butylperoxy carbonate, tri(t-butylperoxy)-1,3,5-triazine, tri(t-butylperoxy) trimellitate, and the like; an alkyl peroxy compound such as cumyl peroxide, t-butyl peroxide, 1,1-di(t-butylperoxy) cyclohexane, 2,2-bis(4,4-di(t-butylperoxy) cyclohexyl) propane, and the like; and an alkyl peroxy-alkyl fumarate-based compound such as t-butylperoxy methylfumarate, t-butylperoxy ethylfumarate, and the like. The above-listed compounds may be used alone or in combination. The polymerization initiator may be used in an amount of about 0.01 to about 10 parts by weight, based on about 100 parts by weight of the mixture of monomers used to prepare the tetrapolymer.

The suspension may further include a molecular weight modifier to adjust the molecular weight. Examples of the molecular weight modifier may include without limitation n-dodecyl mercaptan, n-amyl mercaptan, t-butyl mercaptan, t-dodecyl mercaptan, n-hexyl mercaptan, n-octyl mercaptan, n-nonyl mercaptan, and the like, and mixtures thereof. The amount of the molecular weight modifier may be in a range of about 0.01 parts by weight to about 0.5 parts by weight, based on about 100 parts by weight of the monomers.

The step of polymerizing of the suspension may include polymerizing the suspension at a temperature of about 70° C. to about 100° C., for example about 75° C. to about 90° C. Within this temperature range, polymerization uniformity may be improved, and the overall physical properties of the copolymer may be further improved. Within this temperature range, the thermal history applied to the copolymer upon polymerization may be reduced, resulting in an additional increase in discoloration resistance.

Other embodiments include a thermoplastic resin composition including the aromatic vinyl based tetrapolymer prepared by the above-described preparation method, as well as the aromatic vinyl based tetrapolymer as described above. Such a thermoplastic resin composition may be used to prepare a molded article. The aromatic vinyl based tetrapolymer may be mixed with another thermoplastic resin to realize high heat resistance, and can have excellent processability and/or discoloration resistance.

The aromatic vinyl based tetrapolymer may be used in an amount of about 5 wt % to about 55 wt %, based on the total weight (100 wt %) of the thermoplastic resin composition.

The another thermoplastic resin may be used in an amount of about 45 wt % to about 95 wt %, based on the total weight (100 wt %) of the thermoplastic resin composition.

Examples of the another thermoplastic resin may include without limitation a styrene-acrylonitrile copolymer (SAN) resin, a methyl methacrylate-styrene-acrylonitrile copolymer (MSAN) resin, an acrylonitrile-butadiene-styrene copolymer (ABS) resin, a methyl methacrylate-acrylonitrile-butadiene-styrene copolymer (MABS) resin, an acrylonitrile-styrene-acrylate copolymer (ASA) resin, a polycarbonate (PC)/acrylonitrile-butadiene-styrene copolymer (ABS) alloy resin, a polycarbonate (PC)/acrylonitrile-styrene-acrylate copolymer (ASA) alloy resin, a polymethyl methacrylate (PMMA)/acrylonitrile-butadiene-styrene copolymer (ABS) alloy resin, a polymethyl methacrylate (PMMA)/methyl methacrylate-acrylonitrile-butadiene-styrene copolymer (MABS) alloy resin, and/or a polymethyl methacrylate (PMMA)/acrylonitrile-styrene-acrylate copolymer (ASA) alloy resin. These resins may be used alone or in combination.

The thermoplastic resin composition may further include one or more additives. By way of example, the thermoplastic resin composition may further include at least one Examples of the additives can include without limitation impact modifiers, anti-dripping agents, antioxidants, plasticizers, thermal stabilizers, photostabilizers, compatibilizing agents, weathering stabilizers, pigments, dyes, inorganic additives, and the like, and mixtures thereof.

The thermoplastic resin composition may be prepared using known methods. For example, the thermoplastic resin composition may be prepared in the form of a pellet or chip by mixing the components described herein together with one or more optional additives, and melt-extruding the resulting mixture in an extruder.

Other exemplary embodiments include a molded article formed of the thermoplastic resin composition. A method of molding the thermoplastic resin composition into a molded article is not particularly limited. For example, the thermoplastic resin composition may be subjected to a molding method such as extrusion, injection, compression or casting.

In exemplary embodiments, the molded article may have a yellow index (YI) of less than about 45. Within this yellow index (YI) range, the aromatic vinyl based tetrapolymer can have a slight change in color after the thermoplastic resin composition is prepared into the molded article. In some embodiments, the molded article may have a yellow index ranging from about 26 to about 45. In other exemplary embodiments, the yellow index (YI) of the molded article may be less than or equal to about 40, about 30, about 28, or about 26. Within this yellow index (YI) range, the aromatic vinyl based tetrapolymer may have excellent appearance characteristics when applied to molded articles.

Hereinafter, embodiments of the present invention will be described in further detail in the following examples. It should be understood that these examples are provided for illustration only and are not to be construed in any way as limiting the present invention.

<Method of Evaluating Physical Properties>

(1) Weight Average Molecular Weight ($M_w$)

A powder sample is dissolved in tetrahydrofuran (THF), and the weight average molecular weight of the sample is measured at a temperature of 35° C. using gel permeation chromatography (GPC; Agilent Technologies 1200 series). Shodex LF-804 (8.0.1.D.×300 mm), and polystyrene (Shodex Co. Ltd.) are used as a column and a standard sample, respectively.

(2) Glass Transition Temperature ($T_g$)

The sample is first heated to a temperature of 160° C. at a rate of 20° C./min using DSC Q20 commercially available from TA Instruments Co. Ltd., slowly cooled to maintain an equilibrium state at 50° C., and heated to a temperature of 160° C. at a rate of 10° C./min. An inflection point in the endothermic transition curve is determined as a glass transition temperature.

(3) Measurement of Content of Inorganic Dispersing Agent Included in Copolymer

The amount of inorganic dispersing agent in the aromatic vinyl based tetrapolymer prepared in examples 1 to 5 is analyzed by inductively coupled plasma (ICP) analysis, and FT-IR analysis.

A. Quantitative Analysis of Calcium Cations Through ICP Analysis

Source: argon plasma (6,000 to 10,000 K)

Mass spectrometer vacuum: $<1\times10^{-6}$ torr

Detector: discrete dynode multiplier tube

DRC gas: NH3 (gas flow: 0 to 1.4 mL/min)

B. Analysis of Phosphate Anions Through FT-IR Analysis

A powder of an aromatic vinyl based tetrapolymer is analyzed using FT-IR (the specifications of the apparatus are as follows) to measure the intensities of sharp and strong absorbance peaks of phosphate anions in the vicinity of approximately 1,050 $cm^{-1}$.

1. Apparatus and Tools

FT-IR FTS 7000E/UMA600

2. Measurement Conditions

Resolution [$cm^{-1}$]: 8

Scans: 16

Spectrum detection zone: 4,000 $cm^{-1}$ to 400 $cm^{-1}$ (4) Yellow Index (YI)

The yellow indexes (YI) of specimens (10×10 $cm^2$) obtained by extruding and injecting a thermoplastic resin composition, which includes 30% by weight of a styrenic tetrapolymer, 25% by weight of a rubber-modified diene-based graft copolymer resin, and 45% by weight of a styrene-acrylonitrile (SAN) resin having a molecular weight of 130,000 g/mol, at a proper processing temperature. The YI measurements are performed using a spectrophotometer CM-3600d according to the ASTM E313 standard.

Example 1

A mixture of monomers including 8% by weight of styrene (SM), 24% by weight of acrylonitrile (AN), 50% by weight of α-methylstyrene (AMS), and 18% by weight of N-phenyl maleimide (PMI) in 1,400 g of ion-exchanged water is put into a reactor, and 0.2 parts by weight of 2,2'-azobisisobutyronitrile (AIBN), 0.5 parts by weight of tricalcium phosphate (TCP), 0.05 parts by weight of t-dodecyl mercaptan, and 0.03 parts by weight of polyacrylic acid are put into the reactor, each based on 100 parts by weight of the mixture of monomers. Thereafter, the resulting mixture is stirred at 300 rpm (linear velocity: 2.3 m/s) to prepare a suspension. In this case, the N-phenyl maleimide is dissolved in acrylonitrile, and put into the reactor. The suspension is put into a reactor coated with a SUS material, warmed to 80° C., reacted at 300 rpm for 2 hours, and then cooled. Then, the resulting reaction solution is centrifuged to separate solid and liquid components, and the solid and liquid components are then dehydrated and dried to obtain a styrenic tetrapolymer.

The obtained styrenic tetrapolymer has a weight average molecular weight of 150,000 g/mol, a glass transition temperature of 134° C., and a conversion rate of 96%. Also, the peaks (with an absorbance intensity of 0.2) of phosphate anions are confirmed in the vicinity of approximately 1,050 $cm^{-1}$ by means of FT-IR. As a result, the ICP analysis results show that the mass ratio of the calcium cations is 0.015%, and the yellow index (YI) is proven to be 30.

Example 2

A styrenic tetrapolymer is prepared in the same manner as in Example 1, except that the amounts of the monomers are changed to include styrene (SM) at 20% by weight, acrylonitrile (AN) at 24% by weight, α-methylstyrene (AMS) at 40% by weight, and N-phenyl maleimide (PMI) at 16% by weight.

The obtained styrenic tetrapolymer has a weight average molecular weight of 160,000 g/mol, a glass transition temperature of 132° C., and a conversion rate of 98%. Also, the peaks (with an absorbance intensity of 0.2) of phosphate anions are confirmed in the vicinity of approximately 1,050 $cm^{-1}$ by means of FT-IR. As a result, the ICP analysis results show that the mass ratio of the calcium cations is 0.013%, and the yellow index (YI) is proven to be 30.

Example 3

A styrenic tetrapolymer is prepared in the same manner as in Example 1, except that the amounts of the monomers are changed to include styrene (SM) at 20% by weight, acrylonitrile (AN) at 20% by weight, α-methylstyrene (AMS) at 40% by weight, and N-phenyl maleimide (PMI) at 20% by weight.

The obtained styrenic tetrapolymer has a weight average molecular weight of 156,000 g/mol, a glass transition temperature of 137° C., and a conversion rate of 98%. Also, the peaks (with an absorbance intensity of 0.2) of phosphate anions are confirmed in the vicinity of approximately 1,050 $cm^{-1}$ by means of FT-IR. As a result, the ICP analysis results show that the mass ratio of the calcium cations is 0.011%, and the yellow index (YI) is proven to be 28.

Example 4

A styrenic tetrapolymer is prepared in the same manner as in Example 1, except that the amounts of the monomers are changed to include styrene (SM) at 8% by weight, acrylonitrile (AN) at 29% by weight, α-methylstyrene (AMS) at 33% by weight, and N-phenyl maleimide (PMI) at 30% by weight. The obtained styrenic tetrapolymer has a weight average molecular weight of 160,000 g/mol, a glass transition temperature of 145° C., and a conversion rate of 95%. Also, the peaks (with an absorbance intensity of 0.2) of phosphate anions are confirmed in the vicinity of approximately 1,050 $cm^{-1}$ by means of FT-IR. As a result, the ICP analysis results show that the mass ratio of the calcium cations is 0.012%, and the yellow index (YI) is proven to be 40.

Example 5

A styrenic tetrapolymer is prepared in the same manner as in Example 1, except that the amounts of the monomers are changed to include styrene (SM) at 28% by weight, acrylonitrile (AN) at 22% by weight, α-methylstyrene (AMS) at 40% by weight, and N-phenyl maleimide (PMI) at 10% by weight. In this case, owing to the low content of PMI, the resulting mixture is reacted at 80° C. for 3 hours, cooled, dehydrated, and then dried.

The obtained styrenic tetrapolymer has a weight average molecular weight of 128,000 g/mol, a glass transition temperature of 119° C., and a conversion rate of 94%. Also, the peaks (with an absorbance intensity of 0.2) of phosphate anions are confirmed in the vicinity of approximately 1,050 $cm^{-1}$ by means of FT-IR. As a result, the ICP analysis results show that the mass ratio of the calcium cations is 0.01%, and the yellow index (YI) is proven to be 26.

Comparative Example 1

Ethylbenzene used as a solvent is put into a reactor, a mixture of 20% by weight of styrene (SM), 24% by weight of acrylonitrile (AN), 40% by weight of α-methylstyrene (AMS), and 16% by weight N-phenyl maleimide (PMI) is put into the reactor, and 0.02 parts by weight of 1,1-di(t-butylperoxy)cyclohexane is added as an initiator, based on 100 parts by weight of the mixture of monomers. Then, the resulting mixture is polymerized at a reaction temperature of 105° C. for 4 hours. The reaction solution is run at a vacuum of 350 torr and a temperature of 150° C. in a devolatilization apparatus to recover unreacted monomers, and the molten polymers are prepared into a styrenic tetrapolymer in the form of a pellet using an extruder equipped with a vacuum apparatus whose cylinder temperature is set as 180 to 260° C.

The obtained styrenic tetrapolymer has a weight average molecular weight of 12,000 g/mol, a glass transition temperature of 130° C., and a conversion rate of 60%. The yellow index (YI) is proven to be 45.

TABLE 1

|  | Example 1 | Example 2 | Example 3 | Example 4 | Example 5 | Comparative Example 1 |
| --- | --- | --- | --- | --- | --- | --- |
| Weight average molecular weight (g/mol) | 150,000 | 160,000 | 156,000 | 160,000 | 128,000 | 12,000 |
| Glass transition temperature (° C.) | 134 | 132 | 137 | 145 | 119 | 130 |
| Conversion rate (%) | 96 | 98 | 98 | 95 | 94 | 60 |

TABLE 1-continued

|  | Example 1 | Example 2 | Example 3 | Example 4 | Example 5 | Comparative Example 1 |
|---|---|---|---|---|---|---|
| Residual amount of inorganic dispersing agent (%) in tetrapolymer | 0.015 | 0.013 | 0.011 | 0.012 | 0.01 | — |
| Yellow index (YI) | 30 | 30 | 28 | 40 | 26 | 45 |

As listed in Table 1, the tetrapolymers prepared by the suspension method of Examples 1 to 5 have a high conversion rate of 90% or more. Also, the molded articles prepared from the tetrapolymers of Examples 1 to 5 have a low yellow index of less than about 45, or about 40 or less.

In contrast, the tetrapolymer which is not prepared by suspension polymerization as described in Comparative Example 1 has low economic feasibility due to a very low conversion rate, and it is difficult to recover the unreacted monomers.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention is defined by the appended claims and equivalents thereof.

What is claimed is:

1. A method for preparing a tetrapolymer, the method comprising:
    preparing a suspension comprising an aromatic vinyl-based monomer, an unsaturated nitrile-based monomer, an N-substituted maleimide-based monomer, an α-alkyl styrene-based monomer, and an inorganic dispersing agent, wherein the step of preparing of the suspension includes adding the N-substituted maleimide-based monomer to a dispersion medium in a state in which the N-substituted maleimide-based monomer is dissolved in the unsaturated nitrile-based monomer; and
    polymerizing the suspension.

2. The method of claim 1, wherein the inorganic dispersing agent is added in an amount of about 0.01 parts by weight to about 20 parts by weight, based on about 100 parts by weight of the monomers.

3. The method of claim 1, wherein the inorganic dispersing agent comprises tricalcium phosphate, dicalcium phosphate, calcium phosphate, or a mixture thereof.

4. The method of claim 1, wherein the N-substituted maleimide-based monomer is included at in an amount of about 5% by weight to about 35% by weight, based on the total weight of the monomers.

5. The method of claim 1, wherein a weight ratio of the N-substituted maleimide-based monomer and the unsaturated nitrile-based monomer is about 1:0.95 to about 1:8.

6. The method of claim 1, wherein the suspension further comprises an organic dispersing agent.

7. The method of claim 1, wherein the suspension further comprises a polymerization initiator.

8. The method of claim 1, wherein the step of polymerizing the suspension is conducted at a temperature of about 70° C. to about 100° C.

9. The method of claim 1, wherein the aromatic vinyl-based monomer comprises styrene, vinyltoluene, t-butylstyrene, halogen-substituted styrene, 1,3-dimethylstyrene, 2,4-dimethyl styrene, m-ethyl styrene, o-ethyl styrene, and/or p-ethyl styrene.

10. The method of claim 1, wherein the unsaturated nitrile-based monomer comprises acrylonitrile, methacrylonitrile, ethacrylonitrile, phenylacrylonitrile, and/or α-chloroacrylonitrile.

11. The method of claim 1, wherein the N-substituted maleimide-based monomer comprises N-phenylmaleimide, N-methylmaleimide, N-ethylmaleimide, N-propylmaleimide, N-isopropylmaleimide, N-butylmaleimide, N-isobutylmaleimide, N-t-butylmaleimide, N-cyclohexylmaleimide, N-chlorophenylmaleimide, N-methylphenylmaleimide, N-bromophenylmaleimide, N-naphthylmaleimide, N-laurylmaleimide, N-hydroxyphenylmaleimide, N-methoxyphenylmaleimide, N-carboxyphenylmaleimide, N-nitrophenylmaleimide, and/or N-benzylmaleimide.

12. The method of claim 1, wherein the α-alkyl styrene-based monomer comprises α-methylstyrene, α-ethylstyrene, and/or methyl α-methylstyrene.

13. A tetrapolymer prepared by the method of claim 1, wherein the tetrapolymer comprises an inorganic dispersing agent in an amount of about 0.0001% by weight to about 0.1% by weight.

14. The tetrapolymer of claim 13, wherein the tetrapolymer has a glass transition temperature ($T_g$) of about 100° C. to about 150° C.

15. The tetrapolymer of claim 13, wherein the tetrapolymer has a weight average molecular weight of about 128,000 g/mol to about 160,000 g/mol.

16. A thermoplastic resin composition comprising the tetrapolymer of claim 13.

17. A molded article comprising the thermoplastic resin composition of claim 16.

18. The method of claim 1, wherein the step of adding the N-substituted maleimide-based monomer to the dispersion medium in a state in which the N-substituted maleimide-based monomer is dissolved in the unsaturated nitrile-based monomer comprises dissolving a solid-phase N-substituted maleimide-based monomer in the unsaturated nitrile-based monomer in advance and thereafter adding the resulting mixture to the dispersion medium.

19. The method of claim 6, wherein organic dispersing agent comprises a homopolymer and/or a copolymer of acrylic acid and/or methacrylic acid.

20. The tetrapolymer of claim 13, wherein the tetrapolymer further comprises an organic dispersing agent in an amount of about 0.0001% by weight to about 0.1% by weight.

21. The tetrapolymer of claim 20, wherein the organic dispersing agent comprises a homopolymer and/or a copolymer of acrylic acid and/or methacrylic acid.

* * * * *